United States Patent

[11] 3,582,778

| [72] | Inventor | Eric Andrew Faulkner<br>Reading, England |
| --- | --- | --- |
| [21] | Appl. No. | 801,966 |
| [22] | Filed | Feb. 25, 1969 |
| [45] | Patented | June 1, 1971 |
| [73] | Assignee | Brookdeal Electronics Limited<br>Bracknell, England |
| [32] | Priority | Mar. 20, 1968, May 7, 1968 |
| [33] | | Great Britain |
| [31] | | 13453/68 and 21524/68 |

[54] MICROWAVE MAGNETIC RESONANCE SPECTROMETERS INCORPORATING GUNN-EFFECT OSCILLATORS
6 Claims, 1 Drawing Fig.

[52] U.S. Cl.................................................. 324/0.5,
331/107, 324/58.5
[51] Int. Cl........................................................ G01n 27/78

[50] Field of Search............................................ 324/0.5,
58.5; 331/107, (Inquired)

[56] References Cited
UNITED STATES PATENTS
| 3,439,290 | 4/1969 | Shinoda........................ | 331/107 |
| 3,080,520 | 3/1963 | O'Reilly ........................ | 324/0.5 |

*Primary Examiner*—Michael J. Lynch
*Attorney*—Carson, Taylor & Hinds

ABSTRACT: A microwave magnetic resonance spectrometer comprises a cavity in which a specimen is placed and which is energized from a Gunn diode. The cavity is subjected to a magnetic field having a steady component, an oscillatory component and a sweep component. Any electron spin resonance in a specimen absorbs microwave energy to alter the O value of the cavity and this can be detected by a change in the amplitude of the microwave signal from the cavity.

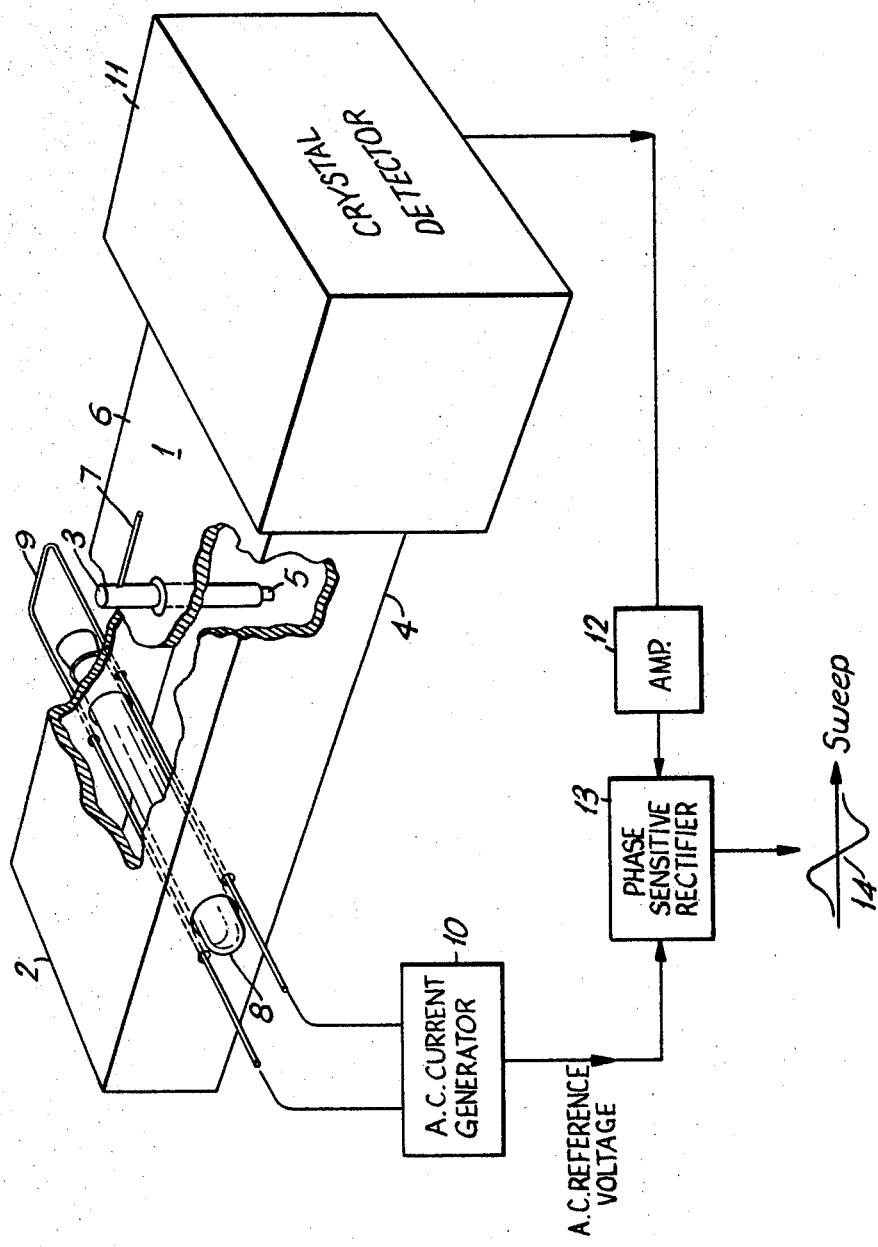

MICROWAVE MAGNETIC RESONANCE SPECTROMETERS INCORPORATING GUNN-EFFECT OSCILLATORS

This invention relates to microwave magnetic resonance spectrometers and has particular application in the detection and measurement of electron spin resonance signals.

According to the present invention a microwave magnetic resonance spectrometer comprises a cavity, a Gunn diode microwave generator mounted so that when energized it causes the cavity to resonate, means for holding a specimen of material within the cavity, means for generating a magnetic field having an oscillatory component in the region of the specimen, and means for detecting the resultant oscillatory changes in amplitude of the microwave energy in the cavity.

In carrying out the invention the Gunn diode may be mounted in a conducting post positioned at one end of the cavity so as to act as a short circuit or the equivalent of a cavity wall. Preferably the post is insulated from the cavity for direct current to enable an operating potential to be applied through the post across the Gunn diode.

The detecting means may comprise a crystal detector and a phase sensitive rectifier the signal input which is derived from the detector and the reference input to which is derived from a generator supplying the oscillatory transverse magnetic field applied to the specimen.

Conveniently the oscillatory component of the magnetic field may be generated by means of a wire loop positioned so as to surround the location of the specimen and through which an oscillatory current is passed.

In order that the invention may be more fully understood, reference will now be made to the accompanying drawing, the single FIGURE of which is a part-cutaway perspective view illustrating an embodiment thereof.

In the FIGURE a length of waveguide 1 has one end closed by a conductive wall 2 and a metallic post 3 is positioned centrally of the guide spaced apart from end wall 2 a suitable distance so as to define a resonant cavity in the waveguide between end wall 2 and post 3. Between post 3 and the lower wall 4 of the waveguide there is sandwiched a Gunn diode 5 and post 3 is held electrically insulated for direct current from the wall 6 of the waveguide opposite to wall 4. Spring pressure is applied to post 3. By means of an external electrical connection 7 to post 3 a DC operating potential can be applied across Gunn diode 5 to generate microwave energy and cause the cavity to oscillate at its resonant frequency.

The cavity is provided with a facility for holding a specimen, which may for example be contained in a tube 8, the electron spin resonance properties of which it is desired to investigate. The specimen is arranged to be held at a position which is a whole number of half wavelengths from end wall 2 so as to be at a point of maximum microwave field. The part of the cavity containing the specimen is mounted between the poles of a magnet and a wire loop 9 is provided which surrounds tube 8 and by means of which additional transverse magnetic fields can be provided within the specimen. The wire loop is connected to an AC current generator 10 from which it is energized.

While the major part of the microwave energy generated by Gunn diode 5 is dissipated within the resonant cavity a proportion thereof will leak past post 3 and this leakage energy is detected by a detection arrangement 11 including a crystal detector coupled to guide 1. The output from detector 11 is amplified in an amplifier 12 and fed as the signal input to a phase sensitive rectifier 13 the reference input to which is derived from generator 10.

It has been discovered that a resonant cavity suitably energized by a Gunn diode has the important property that the Q value of the cavity, defined as the ratio of the energy stored therein to the energy dissipated per radian of the oscillation cycle, affects the amplitude of the oscillations in the cavity to the extent that the amplitude is proportional to Q over a fairly wide range. Accordingly in the apparatus illustrated the output of detector 11 will be a linear measure of the Q of the cavity. Now the effect of a specimen of material in the cavity in which electron spin resonance is induced is to absorb microwave energy from the cavity and hence decrease the Q value thereof. Accordingly the presence of electron spin resonance in a specimen in the cavity can be detected by a change in the output from detector 11.

Electron spin resonance occurs when the magnitude of the transverse magnetic field in which the specimen is placed has a particular value in relation to the microwave frequency and in order to detect this phenomenon the specimen is subject to the following transverse magnetic fields, namely a steady biassing field generated by the magnet, an oscillatory field of say 100 kHz. due to a current generated in generator 10 and fed to loop 9, and a relatively slow sweep field which can be generated by varying the current through the coils of the magnet or else can be obtained from an additional external coil.

As the transverse magnetic field in a specimen comprising the above components sweeps through an electron spin resonance value a 100 kHz. signal will be detected in crystal detector 11. This signal is amplified in amplifier 12 and compared in phase sensitive rectifier 13 with a reference signal obtained from generator 10. The phase relationship between the two signals is reversed as the sweep field passes through the resonant point so that the output from phase-sensitive rectifier 13 will appear as shown at 14 and is to an approximation, the derivative of the magnetic resonance line shape. The output of phase-sensitive rectifier 13 can be recorded on a suitably connected pen recorder. Alternatively the sweep field can be made repetitive and the waveform 14 displayed on an oscilloscope whose timebase is the sweep waveform.

I claim:

1. A microwave resonance spectrometer comprising a self-oscillating cavity containing a Gunn-effect microwave generator mounted within the cavity for, when energized, causing the cavity to resonate, means for holding a specimen of material within the cavity, means for generating a magnetic field having an oscillatory component in the region of the specimen, and means for detecting the resultant oscillatory changes in amplitude of the microwave energy in the cavity.

2. The spectrometer as claimed in claim 1 in which the Gunn-effect generator is mounted in a conducting post positioned at one end of the cavity and the post is insulated from the cavity for direct current to enable an operating electrical potential to be applied through the post across the Gunn-effect generator.

3. The spectrometer as claimed in claim 2 in which the means for generating the magnetic field having an oscillatory component includes a wire loop surrounding the location of the specimen and an oscillatory current generator coupled to the wire loop.

4. The spectrometer as claimed in claim 4 in which the detecting means comprises a crystal detector positioned to receive microwave energy which leaks from said cavity past said post and a phase-sensitive rectifier the signal input to which is derived from the detector and the reference input to which is derived from the oscillatory current generator.

5. The spectrometer as claimed in claim 1 in which the magnetic field includes a relatively slow sweep component in addition to the oscillatory component.

6. The spectrometer as claimed in claim 5 in which the sweep component is repetitive.